United States Patent
Kou (10) Patent No.: US 7,310,808 B2
(45) Date of Patent: Dec. 18, 2007

(54) METHOD OF AND APPARATUS FOR SUPPORTING AND ENABLING THE SELECTION AND MIXING OF MULTIPLE STREAMS OF AUDIO/VIDEO DATA FROM MULTIPLE SOURCES WITHIN A RECEIVING DEVICE ALLOWING EXTERNAL CONTROL

(75) Inventor: Sho Kou, Saratoga, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 586 days.

(21) Appl. No.: 10/112,805

(22) Filed: Mar. 29, 2002

(65) Prior Publication Data

US 2003/0192062 A1 Oct. 9, 2003

(51) Int. Cl.
*H04N 7/18* (2006.01)
*H04N 7/16* (2006.01)

(52) U.S. Cl. .......................................... 725/80; 725/153

(58) Field of Classification Search .................. 725/80, 725/143, 153
See application file for complete search history.

(56) References Cited

U.S. PATENT DOCUMENTS

| | | | |
|---|---|---|---|
| 5,802,017 A | 9/1998 | Sato et al. | 369/2 |
| 6,061,746 A * | 5/2000 | Stanley et al. | 710/10 |
| 6,182,094 B1 * | 1/2001 | Humpleman et al. | 715/513 |
| 6,202,210 B1 | 3/2001 | Ludtke | 725/20 |
| 6,219,839 B1 | 4/2001 | Sampsell | 725/40 |
| 6,392,695 B1 * | 5/2002 | Watamoto et al. | 348/173 |
| 2001/0056580 A1 * | 12/2001 | Seo et al. | 725/152 |
| 2002/0120944 A1 * | 8/2002 | Wasilewski | 725/140 |

FOREIGN PATENT DOCUMENTS

EP 0 789 502 A2 8/1997

OTHER PUBLICATIONS

"A Bus on a Diet-The Serial Bus Alternative", An Introduction to the P1394 High Performance Serial Bus, Michael Teener, p. 316-321.
"The IEEE-1394 High Speed Serial bus", R.H.J. Bloks, 1996, Phillips Journal of Research, vol. 50, No. 1/2, pp. 209-216.
"P1394 Standard for a High Performance Serial Bus", Jul. 7, 1995, pp. 1-384.
Draft EIA-775, DTV 1394 Interface Specification, pp. 1-116.

* cited by examiner

*Primary Examiner*—Hunter B. Lonsberry
(74) *Attorney, Agent, or Firm*—Haverstock & Owens LLP (57) ABSTRACT

A method of and apparatus for supporting and enabling the selection and mixing of multiple input data streams from multiple sources within a receiving device allowing external control includes a receiving device, a control device and one or more source devices. The receiving device receives input data streams from the source devices. The input data streams are provided as inputs to selectors within the receiving device. The selectors output selective ones of the input data streams to a mixer, based on control information received from a control device. The mixer then combines the selected input data streams into an output stream, based on control information received from the control device. The interfaces and functions of the selectors and the mixer are provided to the control device in response to a request from the control device. As the control device receives control inputs, the control device provides control information to the selectors and the mixer within the receiving device to control the output of the input data streams.

52 Claims, 6 Drawing Sheets

METHOD OF AND APPARATUS FOR SUPPORTING AND ENABLING THE SELECTION AND MIXING OF MULTIPLE STREAMS OF AUDIO/VIDEO DATA FROM MULTIPLE SOURCES WITHIN A RECEIVING DEVICE ALLOWING EXTERNAL CONTROL

FIELD OF THE INVENTION

The present invention relates to the field of selecting and mixing data at a receiving device. More particularly, the present invention relates to the field of selecting and mixing streams of audio/video data at a receiving device to provide an output stream of data under control from an external device.

BACKGROUND OF THE INVENTION

The IEEE standard, "IEEE 1394-2000 Standard For A High Performance Serial Bus," Draft ratified in 2000, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. Ali example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-2000 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-2000 standard provides a high-speed serial bus for interconnecting digital devices thereby providing a universal I/O connection. The IEEE 1394-2000 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-2000 standard is very thin in size compared to other bulkier cables used to connect such devices. Devices can be added and removed from an IEEE 1394-2000 bus while the bus is active. If a device is so added or removed the bus will then automatically reconfigure itself for transmitting data between the then existing nodes. A node is considered a logical entity with a unique address on the bus structure. Each node provides a configuration ROM, a standardized set of control registers and its own address space. Because of these advantages the IEEE 1394-2000 standard provides for a unique networking structure that is capable of incorporating audio/video devices, media play/record devices, computing devices and display devices.

Figure 1:
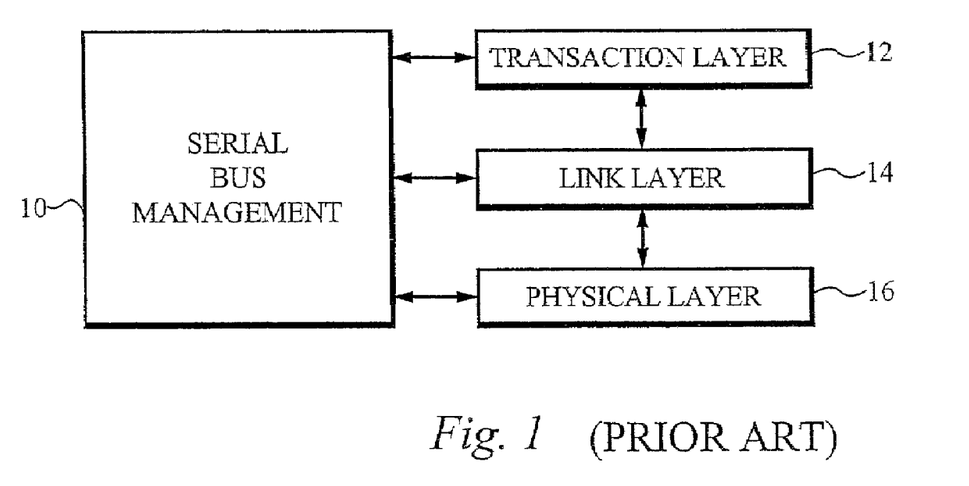
FIG. 1 illustrates a protocol defined by the IEEE 1394-2000 standard.

The IEEE 1394-2000 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-2000 cable. The physical layer 16 also provides arbitration to ensure that all devices coupled to the IEEE 1394-2000 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The transaction layer 12 also provides a path for isochronous management data to be transferred to the serial bus management block 10 via read operations with isochronous control compare-swap registers. The serial bus management block 10 contains an isochronous resource manager for managing isochronous data transfers. The serial bus management block also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A diverse range of products can be implemented with the ability to connect to an IEEE 1394-2000 serial bus network. These devices can have capabilities and functionality ranging from very simple to very complex. Specifically, a variety of audio/video devices, media play/record devices and computing/display devices are capable of being linked together over an IEEE 1394-2000 serial bus networking structure to support asynchronous and isochronous data transfers between the devices.

The IEEE 1394-2000 cable environment is a network of nodes connected by point-to-point links, including a port on each node's physical connection and the cable between them. The physical topology for the cable environment of an IEEE 1394-2000 serial bus is a non-cyclic network of multiple ports, with finite branches. The primary restriction on the cable environment is that nodes must be connected together without forming any closed loops.

Figure 2:
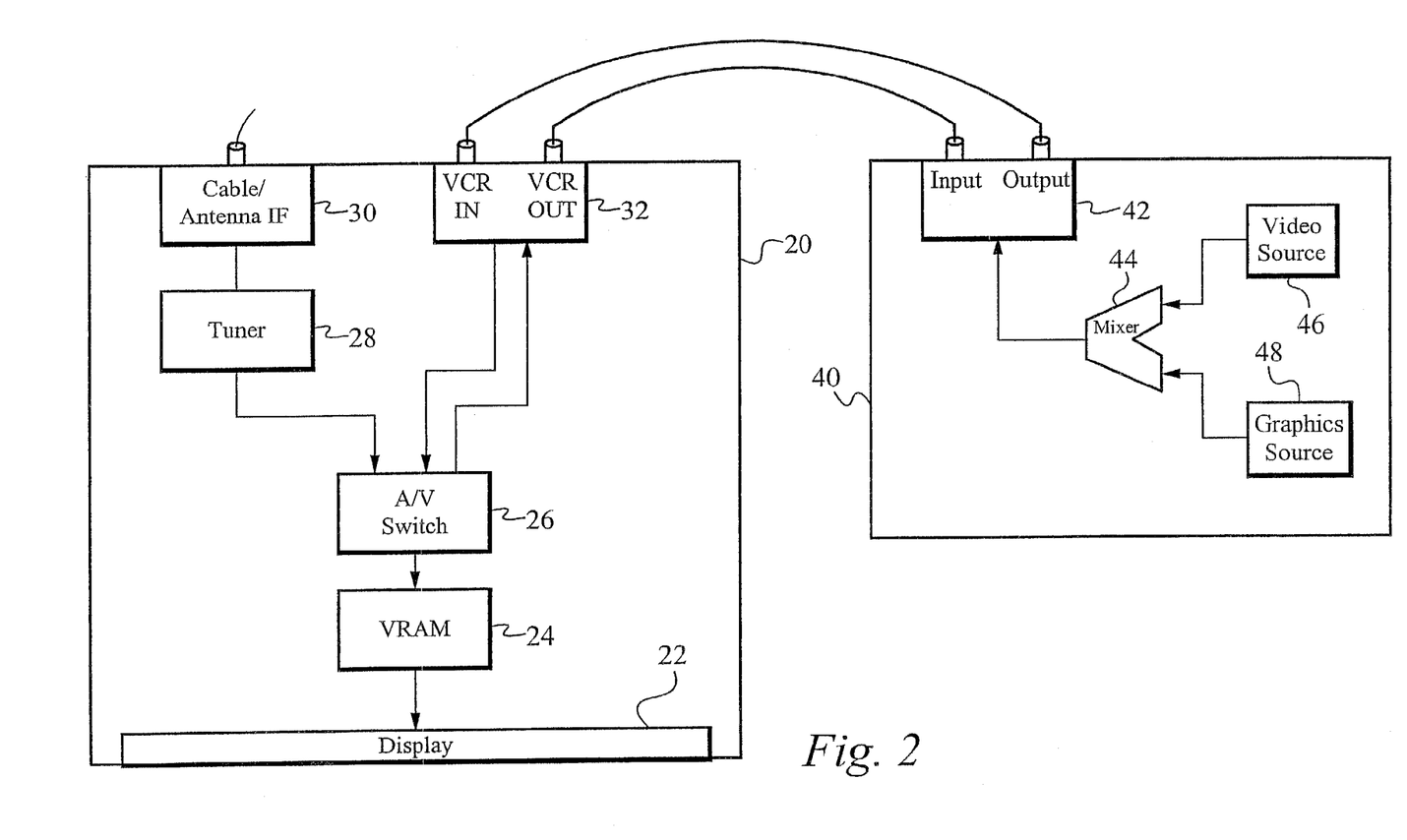
FIG. 2 illustrates a block diagram of a conventional home audio/video network including a television and VCR.

A block diagram of a conventional home audio/video network including a television and an analog video cassette recorder (VCR) is illustrated in FIG. 2. The television 20 is coupled to the analog VCR 40. Video data and associated data are sent between the analog VCR 40 and the television 20 in a known manner.

Relevant internal components of the television 20 and the analog VCR 40 are also illustrated in FIG. 2. The television 20 includes an interface 32 which sends and receives audio and video signals to and from the analog VCR 40. The interface 32 is coupled to an audio/video switch 26 for directing audio/video signals to and from the analog VCR 40. A cable/antenna interface circuit 30 is coupled to receive input signals from a coaxial cable or an antenna and to pass those signals through a tuner 28 to the audio/video switch 26. The audio/video switch 26 is coupled to a video random access memory (VRAM) circuit 24 for providing the video signals from the cable/antenna interface 30 or the analog VCR 40 to the display 22.

The analog VCR 40 includes a video source 46, such as a video tape which is being played by the analog VCR 40 or a television input. The analog VCR 40 also includes a graphics source 48 which generates on-screen-display graphics to be displayed by the television 20 when the analog VCR 40 is sending data to be displayed by the television 20. Such on-screen-display graphics include words or symbols representing commands being executed by the analog VCR 40, such as PLAY, STOP, REWIND, FAST-FORWARD, PAUSE and RECORD. The on-screen-display graphics generated by the graphics source 48 typically also include a menu or menus displayed on the television 20 for the user which allow the user to program the analog VCR 40. On-screen-display graphics generated by the graphics source 48 are provided to a mixer circuit 44. The mixer circuit 44 also receives video data from the video source 46. The mixer circuit 44 then combines the on-screen-display graphics from the graphics source 48 and the video data from the video source 46 into a video output which is transmitted through the interface circuit 42 to the television 20. The video output from the analog VCR 40 is then processed by the television 20 and shown on the display 22. The mixer circuit 44 will, as appropriate, either overlay the on-screen-display graphics onto the video data to form the video output or cause the video output to include only on-screen-display graphics from the graphics source 48 or video data from the video source 46.

In an audio/video network including a digital television and a digital VCR coupled together by an IEEE 1394-1995 serial bus network, the video data from the digital VCR is typically transmitted in a digital format such as MPEG. The digital VCR is not typically responsible for encoding the video data in an MPEG format, but will record and transmit data previously encoded in a MPEG format by another source. In order for the digital VCR to have the ability to combine on-screen-display graphics with the video data, as described above, the digital VCR would have to include an MPEG encoder and have the ability to encode the on-screen-display graphics into an MPEG format and then combine the streams of data into a video output stream of data. Due to the cost of MPEG encoders, such a requirement is cost prohibitive in competitive consumer VCRs.

Some video source devices have the ability to generate a very high bandwidth graphics output which is sent to a display device, such as a television, for on-screen-display to the user. This graphics output can be of very high resolution and color depth, including dynamic animation effects with multiple portions of the graphics data changing on a frequent basis. This graphics data is typically mixed with, or overlaid on top of, a video signal. As described above, it is relatively easy and inexpensive to provide capability within an analog device to combine on-screen-display graphics with a video stream of data and send the combined stream of data to a television or other display device for display to a user or users. It is also relatively easy and inexpensive for a device, such as a video game console to generate a pure graphics output stream and send this output stream over an analog video connection to the television. However, for digital devices, it is quite expensive, to include within the device, the capability to generate graphics data or on-screen-display data and encode this data into a format such as MPEG video in which digital data is typically transmitted. It is cost prohibitive for most consumer devices such as VCRs and video game consoles to include the ability to generate on-screen-display graphics for combination with video and/or transmission to a digital display device as an MPEG stream of video.

The EIA-775, DTV 1394 Interface Specification, draft Nov. 30, 1998, is a standard which defines a specification for a baseband digital interface to a digital television that provides a level of functionality that is similar to the analog system illustrated in FIG. 2 and described above. Within the EIA-775 specification, an audio/video source capable of producing analog audio and video and also an MPEG transport stream, is coupled to a digital television receiver. The analog signal is transmitted over a standard coaxial cable and the MPEG data is transmitted isochronously over an IEEE 1394 serial bus. Bitmaps of the source on-screen-display data are sent by asynchronous connections separately over the IEEE 1394 serial bus and are mixed with the decoded MPEG video in the digital television prior to being presented on the display. This process removes the need for the audio/video source to perform the additional MPEG video decodes and re-encodes, described above. However, the process of the EIA-775 specification, requires the audio/video source and the digital television to be connected together by the IEEE 1394 serial bus. The process of the EIA-775 specification does not work with connections other than the IEEE 1394 serial bus.

SUMMARY OF THE INVENTION

A method of and apparatus for supporting and enabling the selection and mixing of multiple input data streams from multiple sources within a receiving device allowing external control includes a receiving device, a control device and one or more source devices. The receiving device receives input data streams from the source devices. The input data streams are provided as inputs to selectors within the receiving device. The selectors output selective ones of the input data streams to a mixer, based on control information received from a control device. The mixer then combines the selected input data streams into an output stream, based on control information received from the control device. The interfaces and functions of the selectors and the mixer are provided to the control device in response to a request from the control device. As the control device receives control inputs, the control device provides control information to the selectors and the mixer within the receiving device to control the output of the input data streams.

In one aspect of the present invention, a method of providing an output data stream comprises receiving one or more input data streams from one or more source devices at a receiving device, receiving control information from a control device, including information regarding selected ones of the one or more input data streams, thereby providing selected input data streams, and mixing information, selecting the selected input data streams based on the control information from the control device and mixing the selected input data streams into the output data stream based on the control information from the control device. The method further comprises sending a request from the control device to the receiving device regarding selection and mixing functions and controls at the receiving device and providing the selection and mixing functions and controls from the receiving device to the control device. The input data streams include one or more of audio/video data streams, on-screen-display data streams and graphics data streams. The control device is preferably external of the receiving device. Alternatively, the control device is internal to the receiving device. The method further comprises outputting the output data stream. The method further comprises receiving control input at the control device and generating the control information based on the control input. The one or more input streams are received over one or more of a network which substantially complies with a version of the IEEE 1394 standard, a connection which substantially complies with a version of universal serial bus standard and a connection which substantially complies with a version of universal plug-and-play standard. The control information is received over one or more of a network which substantially complies with a version of the IEEE 1394 standard, a connection which substantially complies with a version of universal serial bus standard and a connection which substantially complies with a version of universal plug-and-play standard.

In a further aspect of the present invention, a method of controlling a receiving device providing a combination of one or more input data streams as ail output data stream comprises sending a request from a control device to the receiving device regarding selection and mixing functions and controls at the receiving device, providing the selection and mixing functions and controls from the receiving device to the control device and providing control information from the control device to the receiving device, including information regarding selected ones of the one or more input data streams, thereby providing selected input data streams, and mixing information, wherein the selected input data streams are selected and mixed based on the control information. The method further comprises receiving the one or more input data streams from one or more source devices at the receiving device, selecting the selected input data streams based on the control information from the control device and mixing the selected input data streams into the output data stream based on the control information from the control device. The method further comprises outputting the output data stream. The input data streams include one or more of audio/video data streams, on-screen-display data streams and graphics data streams. Preferably, the control device is external of the receiving device. The method further comprises receiving control information at the control device and generating the control information based on the control input. The one or more input streams are received over one or more of a network which substantially complies with a version of the IEEE 1394 standard, a connection which substantially complies with a version of universal serial bus standard and a connection which substantially complies with a version of universal plug-and-play standard. The control information is received over one or more of a network which substantially complies with a version of the IEEE 1394 standard, a connection which substantially complies with a version of universal serial bus standard and a connection which substantially complies with a version of universal plug-and-play standard.

In still a further aspect of the present invention, a receiving device for providing an output data stream comprises means for receiving one or more input data streams configured for coupling to one or more source devices, means for receiving control information configured for coupling to a control device, wherein the control information includes information regarding selected ones of the one or more input data streams, thereby providing selected input data streams, and mixing information, means for selecting coupled to the means for receiving one or more input data streams and the means for receiving control information for selecting the selected input data streams based on the control information from the control device and means for mixing coupled to the means for selecting and to the means for receiving control information for mixing the selected input data streams into the output data stream based on the control information from the control device. The means for receiving control information provides selection and mixing functions and controls to the control device in response to a request from the control device. The receiving device further comprises means for outputting coupled to the means for mixing for outputting the output data stream. The input data streams include one or more of audio/video data streams, on-screen-display data streams and graphics data streams. Preferably, the control device is external of the receiving device. Alternatively, the control device is internal of the receiving device. The means for receiving one or more input data streams is coupled to the source devices by one or more of a network which substantially complies with a version of the IEEE 1394 standard, a connection which substantially complies with a version of universal serial bus standard and a connection which substantially complies with a version of universal plug-and-play standard. The means for receiving control information is coupled to the control device by one or more of a network which substantially complies with a version of the IEEE 1394 standard, a connection which substantially complies with a version of universal serial bus standard and a connection which substantially complies with a version of universal plug-and-play standard.

In a further aspect of the present invention, a receiving device to provide an output data stream comprises a first interface to receive one or more input data streams configured to couple to one or more source devices, a second interface to receive control information configured to couple to a control device, wherein the control information includes information regarding selected ones of the one or more input data streams, thereby providing selected input data streams, and mixing information, one or more selectors coupled to the first interface and to the second interface to select the selected input data streams based on the control information from the control device and a mixer coupled to the selectors and the second interface to mix the selected input data streams into the output data stream based on the control information from the control device. The second interface provides functions and controls of the selectors and the mixer to the control device in response to a request from the control device. The receiving device further comprises an output device coupled to the mixer to output the output data stream. The input data streams include one or more of audio/video data streams, on-screen-display data streams and graphics data streams. Preferably, the control device is external to the receiving device. Alternatively, the control device is internal to the receiving device. The first interface is coupled to the source devices by one or more of a network which substantially complies with a version of the IEEE 1394 standard, a connection which substantially complies with a version of universal serial bus standard and a connection which substantially complies with a version of universal plug-and-play standard. The second interface is coupled to the control device by one or more of a network which substantially complies with a version of the IEEE 1394 standard, a connection which substantially complies with a version of universal serial bus standard and a connection which substantially complies with a version of universal plug-and-play standard.

In still a further aspect of the present invention, a control device to provide control information to a receiving device receiving one or more input data streams to control selection and mixing of the input data streams into an output data stream comprises an interface configured to couple to the receiving device to request selection and mixing function and control information from the receiving device and a control circuit coupled to the interface to receive the selection and mixing function and control information and to provide output control information to the receiving device, wherein the output control information includes information regarding selected ones of the one or more input data streams and a selected combination of the selected ones of the one or more input data streams. The input data streams include one or more of audio/video data streams, on-screen-display data streams and graphics data streams. Preferably, the receiving device is external to the control device. Alternatively, the receiving device is internal to the control device. The interface is coupled to the receiving device by one or more of a network which substantially complies with a version of the IEEE 1394 standard, a connection which substantially complies with a version of universal serial bus standard and a connection which substantially complies with a version of universal plug-and-play standard.

In yet another aspect of the present invention a network of devices to provide an output data stream comprises one or more source devices configured to provide one or input data streams, a control device configured to provide control information regarding selection and mixing of the input data streams into the output data stream, the control device including a control interface configured to provide the control information and a control circuit coupled to the control interface to generate the control information and a receiving device comprising a first receiving interface coupled to the source devices to receive the one or more input data streams, a second receiving interface coupled to the control interface to receive the control information, one or more selectors coupled to the first receiving interface and the second receiving interface to select selected input data streams based on the control information and a mixer coupled to the selectors and the second receiving interface to mix the selected input data streams into the output data stream based on the control information from the control device. The second receiving interface provides functions and controls of the selectors and the mixer to the control device in response to a request from the control device. The receiving device further comprises an output device coupled to the mixer to output the output data stream. The input data streams include one or more of audio/video data streams, on-screen-display data streams and graphics data streams. Preferably, the control device is external to the receiving device. Alternatively, the control device and the receiving device are integrated together. The first receiving interface is coupled to the source devices by one or more of a network which substantially complies with a version of the IEEE 1394 standard, a connection which substantially complies with a version of universal serial bus standard and a connection which substantially complies with a version of universal plug-and-play standard. The second receiving interface is coupled to control interface by one or more of a network which substantially complies with a version of the IEEE 1394 standard, a connection which substantially complies with a version of universal serial bus standard and a connection which substantially complies with a version of universal plug-and-play standard.

DETAILED DESCRIPTION OF THE PREFERRED EMBODIMENT

The method of and apparatus for supporting and enabling the selection and mixing of multiple input data streams from multiple sources within a receiving device allowing external control of the preferred embodiment of the present invention includes a receiving device, a control device and one or more source devices. The receiving device receives input data streams from the source devices. Preferably, the input data streams are streams of audio/video data and on-screen-display/graphics data. Alternatively, the input data streams are streams of any appropriate data type to be selected and mixed into an output stream by the receiving device. The input data streams are provided as inputs to selectors within the receiving device. The selectors output selective ones of the input data streams to a mixer, based on control input received from a control device. The selectors are turned off or on. When a selector is turned off, the selector will not output any input data stream. When a selector is turned on, the selector will output a selected one of the input data streams provided as inputs to the selector. The outputs from the selectors are provided to a mixer. The mixer then combines the selected input data streams into an output stream, based on control input received from the control device. The mixer can select one of the input data streams or can output some combination of the input data streams.

Upon request from the control device, the receiving device exposes the functionality and controls of the selectors and the mixer to the control device, allowing the control device to provide control information to control the selectors and the mixer within the receiving device. As the control device receives control inputs, the control device provides control information to the selectors and the mixer within the receiving device to control the output of the input data streams. The control device receives the control inputs from any appropriate input devices including a remote control, keyboard, mouse or other devices coupled to the control device either by a wired or wireless connection. This allows the control device to control which input data streams are output, how the input data streams are output and how the input data streams are combined for output, if appropriate. Accordingly, for video data streams, the display of multiple input data streams can be selected, displayed together in a tiled format or in separate windows, such as a picture-in-picture format, and on-screen-display/graphics data can be overlaid on video input data streams. For audio data streams, the output of one or more audio source streams can be selected or the audio source streams can be combined together for output.

Figure 3:
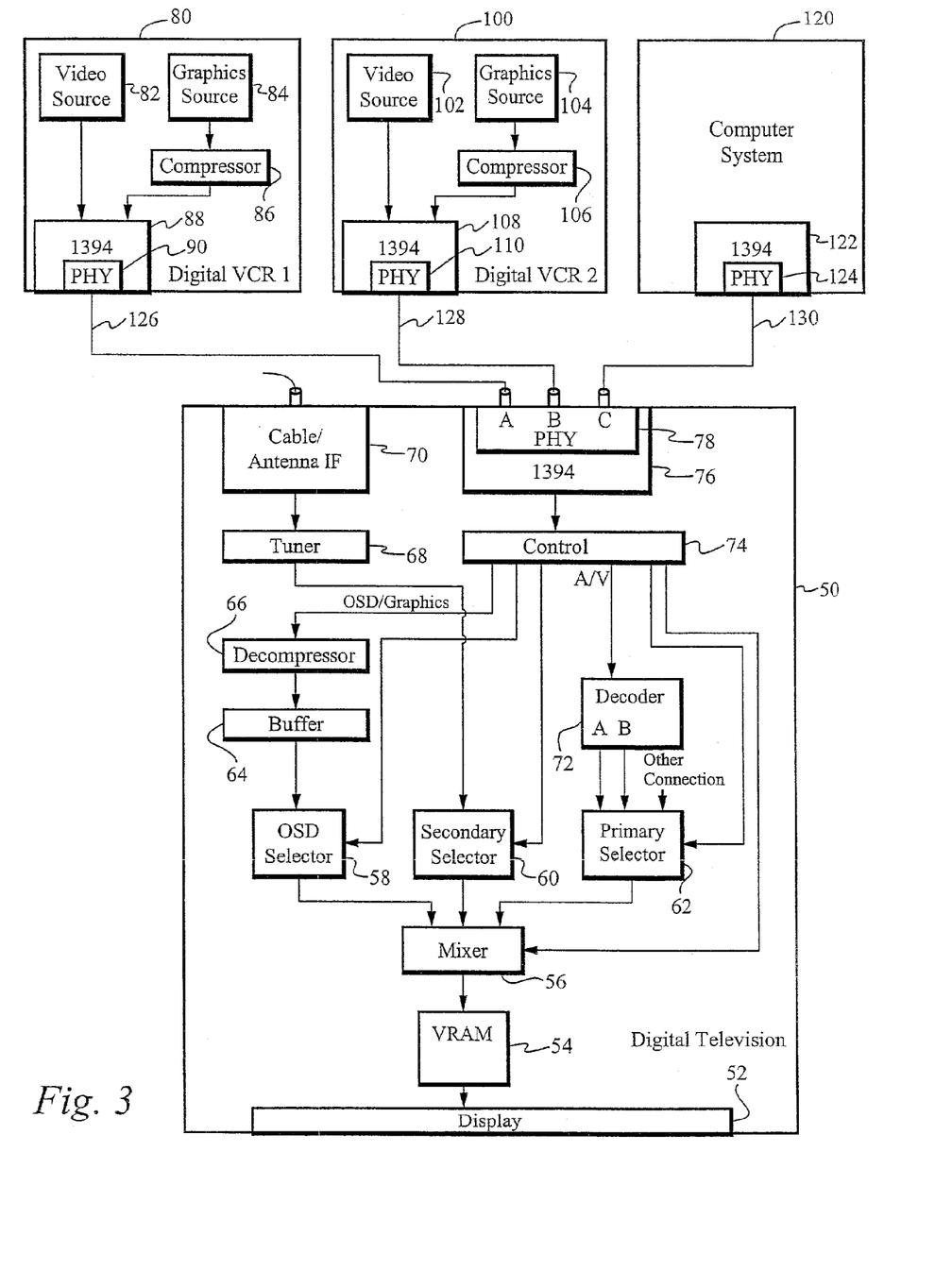
FIG. 3 illustrates a functional block diagram of an exemplary network of devices according to the present invention, including a first digital VCR, a second digital VCR, a computer system and a digital television.

A functional block diagram of an exemplary network of devices including a first digital VCR 80, a second digital VCR 100, a computer system 120 and a digital television 50 is illustrated in FIG. 3. Relevant functional components of the first digital VCR 80, the second digital VCR 100 and the digital television 50 are also illustrated in FIG. 3. The digital television 50 includes an IEEE 1394-2000 interface circuit 76 through which data and commands are sent to and received from the digital VCR 80, the digital VCR 100 and the computer 120, over the IEEE 1394-2000 serial bus cables 126, 128 and 130, respectively. The IEEE 1394-2000 interface circuit 76 includes a physical interface circuit 78. At the physical interface circuit 78, the IEEE 1394-2000 serial bus cables 126, 128 and 130 are coupled to the plug A, the plug B and the plug C, respectively.

The IEEE 1394-2000 interface circuit 76 is coupled to a control circuit 74. The control circuit 74 is coupled to provide audio/video data received from the digital VCRs 80 and 100 on the plugs A and B, to a decoder circuit 72. The control circuit 74 is coupled to provide on-screen-display and graphics data to a decompressor circuit 66. The control circuit 74 is also coupled to an on-screen-display selector 58, a secondary selector 60, a primary selector 62 and a mixer 56 to provide control information to the on-screen-display selector 58, the secondary selector 60, the primary selector 62 and the mixer 56.

The decoder circuit 72 includes an output A and an output B, which are both coupled to inputs of the primary selector 62. The primary selector 62 includes a third input which is configured for coupling to another connection. The decompressor circuit 66 is coupled to provide decompressed on-screen-display and graphics data to a buffer 64. The buffer 64 is coupled to an input of the on-screen-display selector 58.

The digital television 50 includes a cable/antenna interface circuit 70 which is coupled to receive input signals from a coaxial cable or an antenna and to pass those signals through a tuner 68 to an input of the secondary selector 60. The outputs of the on-screen-display selector 58, the secondary selector 60 and the primary selector 62 are coupled to inputs of the mixer 56. An output of the mixer 56 is coupled to a VRAM circuit 54 for providing video and on-screen-display and graphics data to the display 52.

The digital VCR 80 includes an IEEE 1394-2000 interface circuit 88 through which data and commands are sent to and received from the digital television 50. The IEEE 1394-2000 interface circuit 88 includes a physical interface circuit 90. The physical interface circuit 90 is coupled to the digital television 50, over the IEEE 1394-2000 serial bus cable 126. The digital VCR 80 includes a video source 82, such as a video tape, which is being played by the VCR 80, or a television input. The video source 82 is coupled to the IEEE 1394-2000 interface circuit 88 for transmitting video streams of data over the IEEE 1394-2000 serial bus cable 126 to the digital television 50. The digital VCR 80 also includes a graphics source 84 which generates on-screen-display graphics to be displayed by the television 50. The graphics source 84 is preferably coupled to a compression circuit 86 which compresses the graphics data generated by the graphics source 84. The compression circuit 86 is coupled to the IEEE 1394-2000 interface circuit 88 for transmitting the compressed graphics data over the IEEE 1394-2000 serial bus cable 126 to the digital television 50.

The digital VCR 100 includes an IEEE 1394-2000 interface circuit 108 through which data and commands are sent to and received from the digital television 50. The IEEE 1394-2000 interface circuit 108 includes a physical interface circuit 110. The physical interface circuit 110 is coupled to the digital television 50, over the IEEE 1394-2000 serial bus cable 128. The digital VCR 100 includes a video source 102, such as a video tape, which is being played by the digital VCR 100, or a television input. The video source 102 is coupled to the IEEE 1394-2000 interface circuit 108 for transmitting video streams of data over the IEEE 1394-2000 serial bus cable 128 to the digital television 50. The digital VCR 100 also includes a graphics source 104 which generates on-screen-display graphics to be displayed by the digital television 50. The graphics source 104 is preferably coupled to a compression circuit 106 which compresses the graphics data generated by the graphics source 104. The compression circuit 106 is coupled to the IEEE 1394-2000 interface circuit 108 for transmitting the compressed graphics data over the IEEE 1394-2000 serial bus cable 128 to the digital television 50.

The computer system 120 includes an IEEE 1394-2000 interface circuit 122 through which data and commands are sent to and received from the digital television 50. The IEEE 1394-2000 interface circuit 122 includes a physical interface circuit 124. The physical interface circuit 124 is coupled to the digital television 50, over the IEEE 1394-2000 serial bus cable 130. The additional details and exemplary components of the computer system 120 will be described below in detail in reference to FIG. 4.

The configuration illustrated in FIG. 3 is exemplary only. It should be apparent that an audio/video network could include many different combinations of components. It should also be recognized that data, commands and parameters can be sent in either direction between the devices within the IEEE 1394-2000 network, as appropriate.

Figure 4:
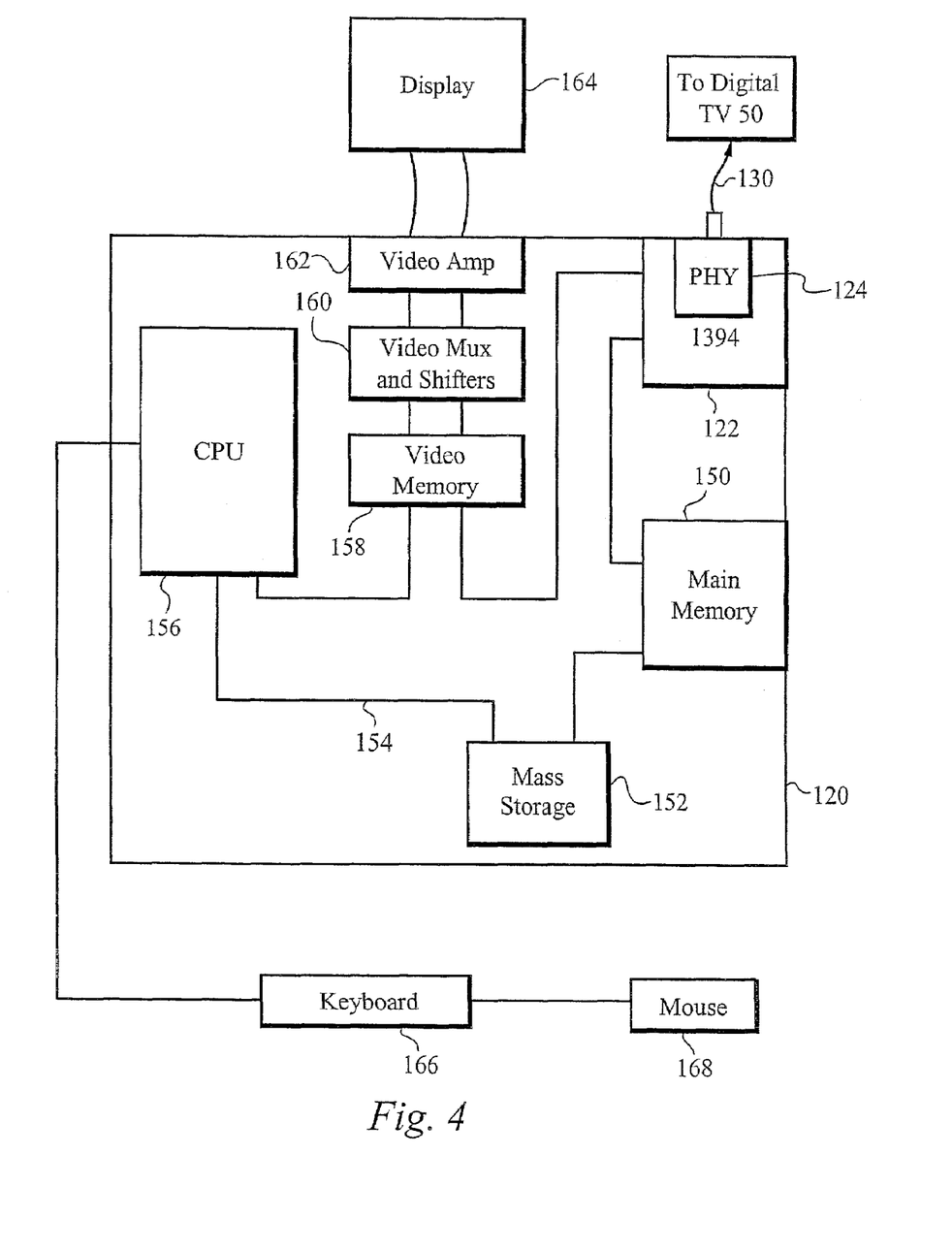
FIG. 4 illustrates a block diagram of the internal components of the computer system 120.

A block diagram of the internal components of the computer system 120 is illustrated in FIG. 4. The computer system 120 includes a central processor unit (CPU) 156, a main memory 150, a video memory 158, a mass storage device 152 and an IEEE 1394-2000 interface circuit 122, all coupled together by a conventional bidirectional system bus 154. The interface circuit 122 includes the physical interface circuit 124 for sending and receiving communications over the IEEE 1394-2000 serial bus. The physical interface circuit 124 is coupled to the digital television 50 over the IEEE 1394-2000 serial bus cable 130. In the preferred embodiment of the present invention, the interface circuit 122 is implemented on an IEEE 1394-2000 interface card within the computer system 120. However, it should be apparent to those skilled in the art that the interface circuit 122 can be implemented within the computer system 120 in any other appropriate manner, including building the interface circuit onto the motherboard itself. The mass storage device 152 may include both fixed and removable media using any one or more of magnetic, optical or magneto-optical storage technology or any other available mass storage technology. The system bus 154 contains an address bus for addressing any portion of the memory 150 and 158. The system bus 154 also includes a data bus for transferring data between and among the CPU 156, the main memory 150, the video memory 158, the mass storage device 152 and the interface circuit 122.

The computer system 120 is also coupled to a number of peripheral input and output devices including the keyboard 166, the mouse 168 and the associated display 164. The keyboard 166 is coupled to the CPU 156 for allowing a user to input data and control commands into the computer system 120. A conventional mouse 168 is coupled to the keyboard 166 for manipulating graphic images on the display 164 as a cursor control display. It should be apparent to those skilled in the art, that the mouse 168 could also be coupled to the CPU 156.

A port of the video memory 158 is coupled to a video multiplex and shifter circuit 160, which in turn is coupled to a video amplifier 162. The video amplifier 162 drives the display 164. The video multiplex and shifter circuitry 160 and the video amplifier 162 convert pixel data stored in the video memory 158 to raster signals suitable for use by the display 164.

The digital television 50 is a receiving device, which receives input streams of data from source devices coupled to the digital television 50. In the example illustrated in FIG. 3, the source devices 80 and 100 are coupled to the digital television 50 by the IEEE 1394-2000 cables 126 and 128 and the cable input is coupled to the cable/antenna interface 70. It should be apparent however that the source devices 80 and 100 could be coupled to the digital television 50 by any appropriate connection means including wired and wireless connections and by any appropriate protocol, including other versions of the IEEE 1394 protocol, universal serial bus, and universal plug-and-play. It should also be apparent that input streams of data could originate from sources within the digital television 50.

In the example illustrated in FIG. 3, the computer system 120 is a control device for controlling the operation of the selectors 58, 60 and 62 and the mixer 56 of the present invention, within the digital television 50. In the example illustrated in FIG. 3, the control device 120 is coupled to the digital television 50 by the IEEE 1394-2000 cable 130. It should also be apparent however that the control device 120 could be coupled to the digital television 50 by any appropriate connection means including wired and wireless connections and by any appropriate protocol, including other versions of the IEEE 1394 protocol, universal serial bus, and universal plug-and-play. Also, in the example illustrated in FIG. 3, the control device 120 is an external device implemented by a computer system. It should be apparent to those skilled in the art that the control device can be any appropriate connected device with the capability to discover and control the selectors 58, 60 and 62 and the mixer 56, including an external control device, an internal control device, a source device and a remote control device.

The input data streams from the sources coupled to the digital television 50 are provided as inputs to the digital television 50. The cable input is provided through the cable/antenna interface 70 to the tuner 68. After being tuned by the tuner 68, the cable input is then provided as an input to the secondary selector 60. The input data streams from the source devices coupled to the digital television through the IEEE 1394-2000 serial bus network are provided through the IEEE 1394 interface circuit 76 to the control circuit 74. The control circuit 74 is coupled to provide the on-screen-display/graphics input data streams to the decompressor 66. The decompressor 66 decompresses the on-screen-display/ graphics input data streams and provides the data to the buffer 64. From the buffer 64, the decompressed on-screen-display/graphics input data is provided as an input to the OSD selector 58. As will be discussed in detail below, the OSD selector 58 selects input data to be output based on a URL address. The control circuit 74 is coupled to provide encoded audio/video data from the IEEE 1394-2000 source devices to the decoder 72. The decoder 72 then decodes the encoded audio/video data and provides the decoded data from the outputs A and B as inputs to the primary selector 62. The outputs A and B from the decoder 72 correspond to the input plugs A and B of the IEEE 1394-2000 physical interface circuit 78. The primary selector 62 has a third input for other connections.

The control input stream from the computer system 120 is provided through the IEEE 1394-2000 interface circuit 76 to the control circuit 74. The control circuit 74 is coupled to provide control signals to the selectors 58, 60 and 62 and to the mixer 56 to control the operation of the selectors 58, 60 and 62 and the mixer 56. Under the control of the control device 120, the control circuit 74 controls the operation of the selectors 58, 60 and 62 to select one or none of the inputs coupled to each of the selectors 58, 60 and 62. In the example of FIG. 3, the OSD selector 58 can be controlled to output the input on-screen-display/graphics input data stream or to provide no output, the secondary selector 60 can be controlled to output the cable input data stream or to provide no output, and the primary selector 62 can be controlled to output the input data streams corresponding to the IEEE 1394-2000 input plugs A and B, the other connections or to provide no output. When not turned off, the selectors 58, 60 and 62 preferably will only output one of the input data streams at a time.

The outputs from the selectors 58, 60 and 62 are provided as inputs to the mixer circuit 56. Under the control of the control device 120, the control circuit 74 controls the operation of the mixer 56 to provide a mix of the input data streams from the selectors 58, 60 and 62. The output of the mixer 56 is then provided to the VRAM 54 to be displayed on the display 52. Under the control of the control device 120, the control 74 controls the operation of the mixer 56 to combine the input data streams from the selectors 58, 60 and 62 into a combined output data stream to be displayed on the display 52. In this manner, the input data streams from the source devices coupled to the digital television 50 are selected, mixed and displayed, thereby providing opportunities for overlaying input data streams or displaying multiple input data streams at the same time in a tiled or picture-in-picture arrangement. Preferably, the output data stream from the mixer 56 is displayed on the display 52 within the receiving device 50. It should be understood by those skilled in the art, that alternatively, the output data stream from the mixer 56 can be stored for later display or transmitted from the receiving device 50 to another device for display or output at that device.

Utilizing the selectors and mixer of the present invention, the control device 120 controls the operation and display of the digital television 50 to select input data streams at each of the selectors 58, 60 and 62 and to then mix the selected input data streams at the mixer 56 for display on the display 62. In the example of FIG. 3, the selectors 58, 60 and 62 and the mixer 56 are shown as separate blocks within the digital television 50. It should be understood that the functions of the selectors 58, 60 and 62 and the mixer 56 are preferably implemented within software within the digital television 50. Alternatively, the selectors 58, 60 and 62 and the mixer 56 are preferably implemented within firmware, hardware or some combination of software, firmware and hardware.

To provide control inputs to control the operation of the selectors 58, 60 and 62 and the mixer 62, the control device 120 first must discover each of the selectors 58, 60 and 62 and their respective inputs and the mixer 56. To discover the selectors 58, 60 and 62, the mixer 56 and their respective inputs, the control device 120 communicates with the digital television 50 over the IEEE 1394-2000 serial bus network to request this information from the digital television 50. In response to this request for information from the control device 120, the digital television 50 then exposes the functionality of the selectors 58, 60 and 62 and the mixer 56 to the control device 120.

The functionality and control of the selectors 58, 60 and 62 is preferably exposed to the control device 120, through an XML document that describes the selectors 58, 60 and 62 and their inputs to the control device 120. An example of such an XML document corresponding to the selectors 58, 60 and 62 of the example illustrated in FIG. 3 is included below in Table I:

TABLE I

```
Selector:
    <selectors>
        <selector>
            <name>primarySelector</name>
            <dataType>string</dataType>
            <defaultValue>default value</defaultValue>
            <currentValue>current value</currentValue>
            <allowedValueList>
                <allowedValue>1394 Plug A</allowedValue>
                <allowedValue>1394 Plug B</allowedValue>
                <allowedValue>Other Connections</allowedValue>
                <allowedValue>Off</allowedValue>
            </allowedValueList>
        </selector>
        <selector>
            <name>secondarySelector</name>
            <dataType>string</dataType>
            <defaultValue>default value</defaultValue>
            <currentValue>current value</currentValue>
            <allowedValueList>
                <allowedValue>cable input</allowedValue>
                <allowedValue>Off</allowedValue>
            </allowedValueList>
        </selector>
        <selector>
            <name>OSDSelector</name>
            <dataType>string</dataType>
            <defaultValue>default value</defaultValue>
            <currentValue>current value</currentValue>
            <allowedValueList>
                <allowedValue>URL</allowedValue>
                <allowedValue>Off</allowedValue>
            </allowedValueList>
        </selector>
    </selectors>
```

In the example of FIG. 3 and of Table I, the primary selector 62 is used to select an input data stream from the source devices 80 and 100, the secondary selector 60 is used to select the input data stream from the cable/antenna interface 70 and the on-screen-display selector 58 is designated to overlay on-screen-display/graphics data on the selected input data stream. Within the OSD selector, the "currentValue" tag can be written with any appropriate universal resource locator address (URL). This OSD URL can correspond to a location within the buffer 64, representing on-screen-display/graphics data received from the source devices 80 and 100 or from the control device 120 or to any other appropriate URL, identifying information within the digital television 50 or external to the digital television 50. The OSD URL can also identify a web page to be overlaid on the selected input data stream.

In the example of FIG. 3 and of Table I, the primary selector 62 outputs the input data stream corresponding to the IEEE 1394-2000 input plug A, the input data stream corresponding to the IEEE 1394-2000 input plug B, the input data stream corresponding to the other connections or is turned off and does not output ally data stream. The secondary selector 60 outputs the input data stream corresponding to the cable/antenna interface 70 or is turned off and does not output any data stream. The OSD selector 58 outputs the input data stream corresponding to the specified URL or is turned off and does not output ally data stream.

The mixer 56 is utilized to combine the inputs that have been selected by the selectors 58, 60 and 62. The functionality and control of the mixer 56 is preferably exposed to the control device 120, through an XML document that describes the mixer 56 and its inputs to the control device 120. An example of such an XML document corresponding to the mixer 56 of the example illustrated in FIG. 3 is included below in Table II:

TABLE II

```
Video Mixer:
    <process>
        <name>Mixer</name>
        <dataType>string</dataType>
        <defaultValue>default</defaultValue>
        <currentValue>current</currentValue>
        <allowedValueList>
            <allowedValue>Off</allowedValue>
            <allowedValue>Primary on top</allowedValue>
                <control>
                    <name>windowControl</name>
                    <dataType>string</dataType>
                    <defaultValue>default</defaultValue>
                    <currentValue>current</currentValue>
                    <allowedValueList>
                        <allowedValue>maximum</allowedValue>
                        <allowedValue>minimum</allowedValue>
                        <allowedValue>size</allowedValue>
                        <allowedValue>restore</allowedValue>
                    </allowedValueList>
                </control>
            <allowedValue>Secondary on top</allowedValue>
                <control>
                    <name>windowControl</name>
                    <dataType>string</dataType>
                    <defaultValue>default</defaultValue>
                    <currentValue>current</currentValue>
                    <allowed ValueList>
                        <allowedValue>maximum</allowedValue>
                        <allowedValue>minimum</allowedValue>
                        <allowedValue>size</allowedValue>
                        <allowedValue>restore</allowedValue>
                    </allowedValueList>
                </control>
            <allowedValue>OSD selector on top</allowedValue>
                <control>
                    <name>windowControl</name>
                    <dataType>string</dataType>
                    <defaultValue>default</defaultValue>
                    <currentValue>current</currentValue>
                    <allowedValueList>
                        <allowedValue>maximum</allowedValue>
                        <allowedValue>minimum</allowedValue>
                        <allowedValue>size</allowedValue>
                        <allowedValue>restore</allowedValue>
                    </allowedValueList>
                </control>
        </allowedValueList>
    </process>
```

The mixer 56 combines the input data streams from the primary selector 62, the secondary selector 60 and the OSD selector 58 into an output data stream to be displayed on the display 52. Based on the values input to the mixer 56 from the control device 120, the mixer is either turned off or turned on. Preferably, when the mixer 56 is turned off, only the input data stream from the primary selector 62 is output from the mixer 56. When the mixer 56 is not turned off, the mixer 56 combines the input data streams provided from the selectors 58, 60 and 62, according to the values received from the control device 120. The mixer 56 can combine the input data streams in any appropriate manner, under the control of the control device 120. As apparent from the XML document of Table II, the mixer 56 can combine the input data streams from the selectors 58, 60 and 62 in many different combinations, including with the input from the primary selector 62 on top, with the input from the secondary selector 60 on top and with the input from the OSD selector 58 on top. Also, in these combinations, the size and placement of the input data streams from the selectors 58, 60 and 62 within the display can also be controlled.

There is also preferably coordination between the OSD selector 58 and the mixer 56, such that when the OSD selector 58 is turned off, the mixer 56 will not attempt to perform an overlay function.

Figure 5:
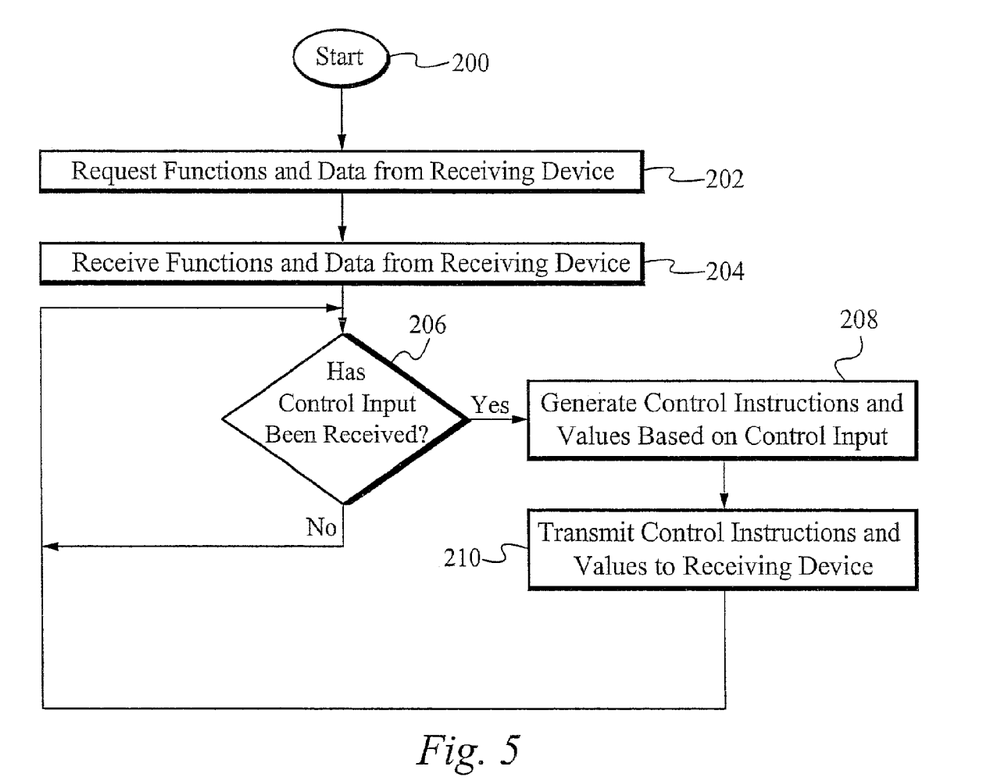
FIG. 5 illustrates a flowchart showing the preferred steps followed by a control device when controlling the functions of selectors and a mixer within a receiving device.

A flowchart showing the preferred steps followed by the control device 120 when controlling the functions of the selectors 58, 60 and 62 and the mixer 56 within the receiving device 50 is illustrated in FIG. 5. The process begins at the step 200. At the step 202, the control device sends a request to the receiving device 50 to request the functions and data from the receiving device 50, regarding the selectors and the mixer implemented within the receiving device 50, as well as the inputs to the selectors and the mixer. At the step 204, the control device 120 receives the requested functions and data from the receiving device 50, thereby exposing the interface and functions of the selectors 58, 60 and 62 and the mixer 56 to the control device 120.

At the step 206, it is determined if the control device 120 has received control input from a user or from a device coupled to the control device 120, regarding the display of the input data streams by the receiving device 50. This control input can be input to the control device 120 by any appropriate means, including through a keyboard, mouse, a remote control or other appropriate device. Once control input regarding the display of the input data streams by the receiving device 50 has been received by the control device 120, the control device 120 then generates control instructions and values based on this control input, at the step 208. At the step 210, the control device 120 then transmits these control instructions and values to the receiving device 50. The process then returns to the step 206 to wait until further control inputs are received by the control device.

Figure 6:
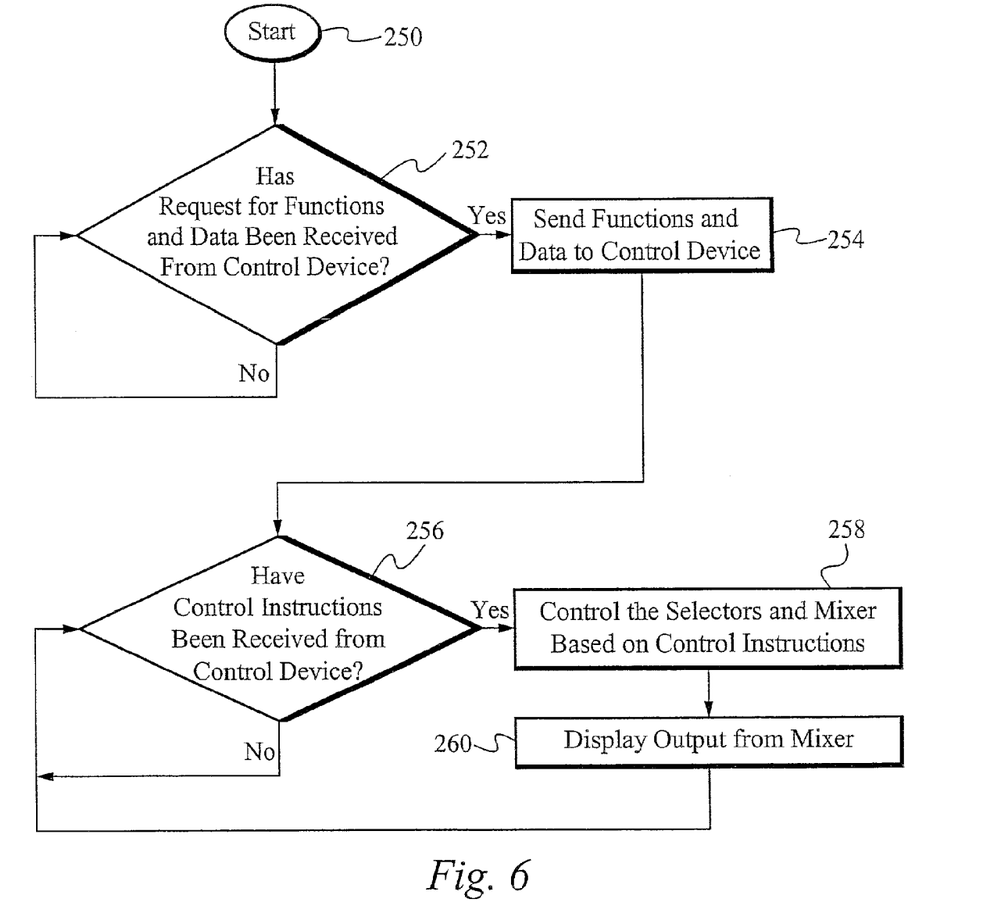
FIG. 6 illustrates a flowchart showing the preferred steps followed by a receiving device to provide an output data stream based on control instructions received from a control device.

A flowchart showing the preferred steps followed by the receiving device 50 to provide an output data stream based on control instructions received from the control device 120, is illustrated in FIG. 6. The process begins at the step 250. At the step 252, it is determined if a request for functions and data has been received from the control device 120. Once it is determined at the step 252 that a request for functions and data has been received from the control device 120, then the functions of the selectors 58, 60 and 62 and the mixer 56 are exposed to the control device 120 at the step 254.

At the step 256, it is determined if control instructions regarding the selection of and mixing of the input data streams has been received from the control device 120. Once it is determined that control instructions have been received from the control device 120 regarding the selection of and mixing of the input data streams at the step 256, then the receiving device 50 provides the control instructions to the selectors 58, 60 and 62 and the mixer 56 to appropriately control the selection and mixing of the input data streams based on the control instructions. The output data stream from the mixer 56 is then displayed by the receiving device 50 on the display 52. The process then returns to the step 256 to wait until further control instructions are received from the control device 120.

As an example of the operation of the present invention within the audio/video network illustrated in FIG. 3, the digital television 50 selects and mixes input data streams from the source devices 80 and 100, from the cable/antenna interface 70 and on-screen-display/graphics data received from the address specified by a URL. Regarding the example illustrated in FIG. 3, the computer system 120 first requests the functions and data for the selectors 58, 60 and 62 and the mixer 56 from the digital television 50. The digital television 50 then exposes the functions and data representing the selectors 58, 60 and 62, the mixer 56 and their respective inputs to the computer system 120, preferably through the XML documents of Table I and Table II, as described above. Alternatively, the functions and data representing the selectors, the mixer and their respective inputs are exposed to the computer system 120 in any appropriate manner.

Once the computer system 120 has been exposed to the functions and data representing the selectors 58, 60 and 62 and the mixer 56, the computer system 120 can then provide control information to the digital television 50 to control the output of the input data streams. As an example, the computer system 120 provides control information to the digital television 50 to initially select the input data stream from the digital VCR 80 through the primary selector 62, to turn the secondary selector 60 off and to turn the OSD selector 58 off. The mixer 56 is then only provided the input data stream from the primary selector 62 to output and display on the display 52. If the computer system 120 then receives a control input to display on-screen-display/graphics information, such as the current time, the computer system 120 generates the appropriate control information and provides this control information to the digital television 50 to turn on the OSD selector 58 and select a URL address corresponding to the current time. This input data stream is then output from the OSD selector 58 and provided to the mixer 56. The mixer 56 will then combine the input data stream from the primary selector 62 and from the OSD selector 58 to display the current time with the input data stream from the digital VCR 80 on the display 52.

The method of and apparatus for supporting and enabling the selection and mixing of multiple input data streams from multiple sources within a receiving device allowing external control of the preferred embodiment of the present invention includes a receiving device, a control device and one or more source devices. The receiving device receives input data streams from the source devices. Preferably, the input data streams are streams of audio/video data and on-screen-display/graphics data. Alternatively, the input data streams are streams of any appropriate data type to be selected and mixed into an output stream by the receiving device. The input data streams are provided as inputs to selectors within the receiving device. The selectors output selective ones of the input data streams to a mixer, based on control input received from a control device. The mixer then combines the selected input data streams into an output stream, based on control input received from the control device.

Upon request from the control device, the receiving device exposes the functionality and controls of the selectors and the mixer to the control device, allowing the control device to provide control information to control the selectors and the mixer within the receiving device. As the control device receives control inputs, the control device provides control information to thee selectors and the mixer within the receiving device to control the output of the input data streams. This allows the control device to control which input data streams are output, how the input data streams are output and how the input data streams are combined for output. Accordingly, for video data streams, the display of multiple input data streams can be selected, displayed together in a tiled format or in separate windows, such as a picture-in-picture format, and on-screen-display/graphics data can be overlaid on video input data streams. For audio data streams, the output of one or more audio source streams can be selected or the audio source streams can be combined together for output.

The combination of the selector and mixer functions of the present invention, allow a control device to discover and control these functions within a receiving device using any appropriate protocol, not just the IEEE 1394-2000 serial bus protocol. Using the present invention, the interfaces and functions of the selectors and the mixer are exposed to external control devices or control points for external control of those functions within a receiving device.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the illustrated embodiment utilizes an IEEE 1394-2000 serial bus structure, the present invention could also be implemented on any other appropriate digital interfaces or bus structures, or with any other appropriate protocols, including other or later versions of the IEEE 1394 serial bus, other local area network protocols or device connection protocols, including current or later versions of the USB protocol and universal plug-and-play protocol. It will also be apparent to those skilled in the art that while the illustrated embodiment utilizes video input data streams, the present invention could also be implemented with any appropriate input data streams, including audio data streams.

I claim:

1. A method of providing an output data stream comprising:
    a. receiving a plurality of input data streams from one or more source devices at a receiving device;
    b. receiving control information by the receiving device from a control device, including information regarding selected ones of the plurality of input data streams, thereby providing selected input data streams, and mixing information;
    c. selecting the selected input data streams from the received plurality of input data streams at the receiving device based on the control information from the control device; and
    d. mixing the selected input data streams at the receiving device into the output data stream based on the control information received by a mixer from the control device.

2. The method as claimed in claim 1 further comprising:
    a. sending a request from the control device to the receiving device regarding selection and mixing functions and controls at the receiving device; and
    b. providing the selection and mixing functions and controls from the receiving device to the control device.

3. The method as claimed in claim 1 wherein the input data streams include audio/video data streams.

4. The method as claimed in claim 1 wherein the input data streams include on-screen-display data streams.

5. The method as claimed in claim 1 wherein the input data streams include graphics data streams.

6. The method as claimed in claim 1 wherein the control device is external of the receiving device.

7. The method as claimed in claim 1 wherein the control device is internal to the receiving device.

8. The method as claimed in claim 1 further comprising outputting the output data stream.

9. The method as claimed in claim 1 further comprising receiving control input at the control device and generating the control information based on the control input.

10. The method as claimed in claim 1 wherein one or more of the plurality of input streams are received over a network which substantially complies with a version of the IEEE 1394 standard.

11. The method as claimed in claim 1 wherein one or more of the plurality of input streams are received over a connection which substantially complies with a version of universal serial bus standard.

12. The method as claimed in claim 1 wherein one or more of the plurality of input streams are received over a connection which substantially complies with a version of universal plug-and-play standard.

13. The method as claimed in claim 1 wherein the control information is received over a network which substantially complies with a version of the IEEE 1394 standard.

14. The method as claimed in claim 1 wherein the control information is received over a connection which substantially complies with a version of universal serial bus standard.

15. The method as claimed in claim 1 wherein the control information is received over a connection which substantially complies with a version of universal plug-and-play standard.

16. A method of controlling a receiving device providing a combination of a plurality of input data streams as an output data stream comprising:
    a. sending a request from a control device to the receiving device regarding selection and mixing functions and controls at the receiving device;
    b. providing the selection and mixing functions and controls from the receiving device to the control device;
    c. receiving the plurality of input data streams at the receiving device; and
    d. providing control information from the control device to the receiving device, including information regarding selected ones of the plurality of input data streams, thereby providing selected input data streams, and mixing information, wherein the selected input data streams are selected from the received plurality of input data streams at the receiving device and mixed at the receiving device based on the control information.

17. The method as claimed in claim 16 further comprising:
    a. receiving the plurality of input data streams from one or more source devices at the receiving device;
    b. selecting the selected input data streams from the received plurality of input data streams at the receiving device based on the control information from the control device; and
    c. mixing the selected input data streams at the receiving device into the output data stream based on the control information received by a mixer from the control device.

18. The method as claimed in claim 17 further comprising outputting the output data stream.

19. The method as claimed in claim 16 wherein the plurality of input data streams include one or more of audio/video data streams, on-screen-display data streams and graphics data streams.

20. The method as claimed in claim 16 wherein the control device is external of the receiving device.

21. The method as claimed in claim 16 further comprising receiving control information at the control device and generating the control information based on the control input.

22. The method as claimed in claim 16 wherein the plurality of input streams are received over one or more of a network which substantially complies with a version of the IEEE 1394 standard, a connection which substantially complies with a version of universal serial bus standard and a connection which substantially complies with a version of universal plug-and-play standard.

23. The method as claimed in claim 16 wherein the control information is received over one or more of a network which substantially complies with a version of the IEEE 1394 standard, a connection which substantially complies with a version of universal serial bus standard and a connection which substantially complies with a version of universal plug-and-play standard.

24. A receiving device for providing an output data stream comprising:
 a. means for receiving a plurality of input data streams configured for coupling to one or more source devices;
 b. means for receiving control information configured for coupling to a control device, wherein the control information includes information regarding selected ones of the one or more input data streams, thereby providing selected input data streams, and mixing information;
 c. means for selecting coupled to the means for receiving the plurality of input data streams and the means for receiving control information for selecting the selected input data streams from the received plurality of input data streams based on the control information from the control device; and
 d. means for mixing coupled to the means for selecting and to the means for receiving control information for mixing the selected input data streams into the output data stream based on the control information received by the means for mixing from the control device.

25. The receiving device as claimed in claim 24 wherein the means for receiving control information provides selection and mixing functions and controls to the control device in response to a request from the control device.

26. The receiving device as claimed in claim 24 further comprising means for outputting coupled to the means for mixing for outputting the output data stream.

27. The receiving device as claimed in claim 24 wherein the plurality of input data streams include one or more of audio/video data streams, on-screen-display data streams and graphics data streams.

28. The receiving device as claimed in claim 24 wherein the control device is external of the receiving device.

29. The receiving device as claimed in claim 24 wherein the control device is internal of the receiving device.

30. The receiving device as claimed in claim 24 wherein the means for receiving the plurality of input data streams is coupled to the source devices by one or more of a network which substantially complies with a version of the IEEE 1394 standard, a connection which substantially complies with a version of universal serial bus standard and a connection which substantially complies with a version of universal plug-and-play standard.

31. The receiving device as claimed in claim 24 wherein the means for receiving control information is coupled to the control device by one or more of a network which substantially complies with a version of the IEEE 1394 standard, a connection which substantially complies with a version of universal serial bus standard and a connection which substantially complies with a version of universal plug-and-play standard.

32. A receiving device to provide an output data stream comprising:
 a. a first interface to receive a plurality of input data streams configured to couple to one or more source devices;
 b. a second interface to receive control information configured to couple to a control device, wherein the control information includes information regarding selected ones of the plurality of input data streams, thereby providing selected input data streams, and mixing information;
 c. one or more selectors coupled to the first interface and to the second interface to receive the plurality of input data streams from the first receiving interface and to select the selected input data streams from the received plurality of input data streams based on the control information received by the second receiving interface; and
 d. a mixer coupled to the selectors and the second interface to mix the selected input data streams into the output data stream based on the control information received by the mixer from the second receiving interface.

33. The receiving device as claimed in claim 32 wherein the second interface provides functions and controls of the selectors and the mixer to the control device in response to a request from the control device.

34. The receiving device as claimed in claim 32 further comprising an output device coupled to the mixer to output the output data stream.

35. The receiving device as claimed in claim 32 wherein the plurality of input data streams include one or more of audio/video data streams, on-screen-display data streams and graphics data streams.

36. The receiving device as claimed in claim 32 wherein the control device is external to the receiving device.

37. The receiving device as claimed in claim 32 wherein the control device is internal to the receiving device.

38. The receiving device as claimed in claim 32 wherein the first interface is coupled to the source devices by one or more of a network which substantially complies with a version of the IEEE 1394 standard, a connection which substantially complies with a version of universal serial bus standard and a connection which substantially complies with a version of universal plug-and-play standard.

39. The receiving device as claimed in claim 32 wherein the second interface is coupled to the control device by one or more of a network which substantially complies with a version of the IEEE 1394 standard, a connection which substantially complies with a version of universal serial bus standard and a connection which substantially complies with a version of universal plug-and-play standard.

40. A control device to provide control information to a receiving device receiving a plurality of input data streams to control selection and mixing of the input data streams into an output data stream comprising:
 a. an interface configured to couple to the receiving device to request selection and mixing function and control information from the receiving device; and
 b. a control circuit coupled to the interface to receive the selection and mixing function and control information and to provide output control information to the receiving device, wherein the output control information includes information regarding selected ones of the plurality of input data streams and a selected combination of the selected ones of the plurality of input data streams such that the receiving device performs selection and mixing of the input data streams based on the received control information.

41. The control device as claimed in claim 40 wherein the plurality of input data streams include one or more of audio/video data streams, on-screen-display data streams and graphics data streams.

42. The control device as claimed in claim 40 wherein the receiving device is external to the control device.

43. The control device as claimed in claim 40 wherein the receiving device is internal to the control device.

44. The control device as claimed in claim 40 wherein the interface is coupled to the receiving device by one or more of a network which substantially complies with a version of the IEEE 1394 standard, a connection which substantially complies with a version of universal serial bus standard and a connection which substantially complies with a version of universal plug-and-play standard.

45. A network of devices to provide an output data stream comprising:
   a. one or more source devices configured to provide a plurality of input data streams;
   b. a control device configured to provide control information regarding selection and mixing of the plurality of input data streams into the output data stream, the control device including:
      i. a control interface configured to provide the control information; and
      ii. a control circuit coupled to the control interface to generate the control information; and
   c. a receiving device comprising:
      i. a first receiving interface coupled to the source devices to receive the plurality of input data streams;
      ii. a second receiving interface coupled to the control interface to receive the control information;
      iii. one or more selectors coupled to the first receiving interface and the second receiving interface to receive the plurality of input data streams from the first receiving interface and to select selected input data streams from the received plurality of input data streams based on the control information received by the second receiving interface; and
      iv. a mixer coupled to the selectors and the second receiving interface to mix the selected input data streams into the output data stream based on the control information received by the mixer from the second receiving interface.

46. The network of devices as claimed in claim 45 wherein the second receiving interface provides functions and controls of the selectors and the mixer to the control device in response to a request from the control device.

47. The network of devices as claimed in claim 45 wherein the receiving device further comprises an output device coupled to the mixer to output the output data stream.

48. The network of devices as claimed in claim 45 wherein the plurality of input data streams include one or more of audio/video data streams, on-screen-display data streams and graphics data streams.

49. The network of devices as claimed in claim 45 wherein the control device is external to the receiving device.

50. The network of devices as claimed in claim 45 wherein the control device and the receiving device are integrated together.

51. The network of devices as claimed in claim 45 wherein the first receiving interface is coupled to the source devices by one or more of a network which substantially complies with a version of the IEEE 1394 standard, a connection which substantially complies with a version of universal serial bus standard and a connection which substantially complies with a version of universal plug-and-play standard.

52. The network of devices as claimed in claim 45 wherein the second receiving interface is coupled to control interface by one or more of a network which substantially complies with a version of the IEEE 1394 standard. a connection which substantially complies with a version of universal serial bus standard and a connection which substantially complies with a version of universal plug-and-play standard.

* * * * *

UNITED STATES PATENT AND TRADEMARK OFFICE
CERTIFICATE OF CORRECTION

PATENT NO.           : 7,310,808 B2                                             Page 1 of 1
APPLICATION NO. : 10/112805
DATED                  : December 18, 2007
INVENTOR(S)          : Sho Kou

It is certified that error appears in the above-identified patent and that said Letters Patent is hereby corrected as shown below:

At column 1, line 30, please replace "Ali" with -- An -- so that the corresponding phrase reads -- An example of --.

At column 22, line 36, Claim 52, please replace "." with -- , -- so that the corresponding phrase reads -- the IEEE 1394 standard, a connection --.

Signed and Sealed this

Twenty-ninth Day of April, 2008

JON W. DUDAS
*Director of the United States Patent and Trademark Office*